US012261393B2

(12) United States Patent
Hamai et al.

(10) Patent No.: US 12,261,393 B2
(45) Date of Patent: Mar. 25, 2025

(54) SEAL MEMBER THAT EXTENDS INTO THE COVER SURFACE OF AN ELECTRICAL CONNECTOR HOUSING

(71) Applicant: YAZAKI CORPORATION, Tokyo (JP)

(72) Inventors: Tsuyoshi Hamai, Makinohara (JP); Takatoshi Suzuki, Makinohara (JP); Junya Yamamoto, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 375 days.

(21) Appl. No.: 17/965,779

(22) Filed: Oct. 14, 2022

(65) Prior Publication Data

US 2023/0122279 A1 Apr. 20, 2023

(30) Foreign Application Priority Data

Oct. 19, 2021 (JP) ................................ 2021-171073

(51) Int. Cl.
*H01R 13/52* (2006.01)
*H01R 13/422* (2006.01)

(52) U.S. Cl.
CPC ....... *H01R 13/5205* (2013.01); *H01R 13/422* (2013.01)

(58) Field of Classification Search
CPC .......................... H01R 13/5205; H01R 13/422
See application file for complete search history.

(56) References Cited

U.S. PATENT DOCUMENTS

| | | | | |
|---|---|---|---|---|
| 6,953,357 | B2 * | 10/2005 | Fukushima ........ | H01R 13/5219 439/271 |
| 7,789,696 | B2 * | 9/2010 | Umei ..................... | H05K 5/063 439/447 |
| 7,828,591 | B2 * | 11/2010 | Matsuoka ............ | H01R 13/748 439/607.55 |
| 10,218,130 | B1 * | 2/2019 | Jung .................... | H01R 13/506 |
| 2016/0233625 | A1 | 8/2016 | Kato et al. | |
| 2020/0106209 | A1 * | 4/2020 | Takahashi .......... | H01R 13/5205 |

FOREIGN PATENT DOCUMENTS

| | | | |
|---|---|---|---|
| JP | 2015-79723 | A | 4/2015 |
| JP | 2015-176879 | A | 10/2015 |
| JP | 2017-4850 | A | 1/2017 |

* cited by examiner

*Primary Examiner* — Vanessa Girardi
(74) *Attorney, Agent, or Firm* — KENEALY VAIDYA LLP

(57) ABSTRACT

There is provided a connector including a seal member that seals a gap between an opening inner wall of an opening and a peripheral edge of a cover. The seal member includes a body portion having an annular shape along the peripheral edge of the cover, an extending portion that extends from an end portion of the body portion on a side of an outside along a cover surface of the cover, and a protruding portion that protrudes in a direction of intersecting with an extending direction of the extending portion and extends from the extending portion along the cover surface. The cover includes a recessed fitting portion into which the extending portion and the protruding portion of the seal member are fitted.

2 Claims, 10 Drawing Sheets

SEAL MEMBER THAT EXTENDS INTO THE COVER SURFACE OF AN ELECTRICAL CONNECTOR HOUSING

CROSS-REFERENCE TO RELATED APPLICATIONS

This application is based on and claims priority under 35 USC 119 from Japanese Patent Application No. 2021-171073 filed on Oct. 19, 2021, the contents of which are incorporated herein by reference.

TECHNICAL FIELD

The present disclosure relates to a connector that includes a housing including an internal space, and a cover and a seal member closing an opening connected to the internal space.

BACKGROUND ART

In related art, in order to prevent intrusion of liquids such as water into an internal space of a housing, a connector that includes a cover and a seal member (for example, a packing) for liquid-tightly isolating inside and outside of the internal space is proposed (see, for example, JP2017-004850A).

In the connector including the cover and the seal member as described above, the seal member may be fixed to the cover by inserting a locking projection protruding from the seal member into an insertion hole provided in the cover so that the two are engaged with each other. In this case, it is conceivable to make the locking projection thicker and larger in order to firmly fix the two. However, if a size of the locking projection is increased carelessly, the insertion hole of the cover also needs to be increased in size, and thus leads to a concern that a thickness of the cover will be increased. There is also a concern that a thickness of the seal member will be increased due to provision of the large locking projection. Increase in the thickness of the cover and the thickness of the seal member beyond an extent necessary for water stopping is undesirable from the viewpoint of thickness reduction and downsizing of the connector.

SUMMARY OF INVENTION

The present disclosure provides a connector that can be reduced in thickness and size while properly holding a seal member to a cover.

According to an illustrative aspect of the present disclosure, a connector includes: a terminal fitting; an electric wire connected to the terminal fitting; a housing that includes an internal space in which the electric wire is routed; an opening that connects the internal space with an outside of the housing; a cover that includes a cover surface closing the opening and is inserted into the opening to isolate the internal space from the outside; and a seal member that seals a gap between an opening inner wall of the opening and a peripheral edge of the cover. The seal member includes a body portion having an annular shape along the peripheral edge of the cover, an extending portion that extends from an end portion of the body portion on a side of the outside along the cover surface, and a protruding portion that protrudes in a direction of intersecting with an extending direction of the extending portion from the extending portion and extends from the extending portion along the cover surface. The cover includes a recessed fitting portion into which the extending portion and the protruding portion of the seal member are fitted.

The present disclosure has been briefly described as above. Details of the present disclosure will be further clarified by reading through a mode for carrying out the present disclosure described below (hereinafter, referred to as "embodiment") with reference to the accompanying drawings.

DESCRIPTION OF EMBODIMENTS

Embodiment

Figure 1:
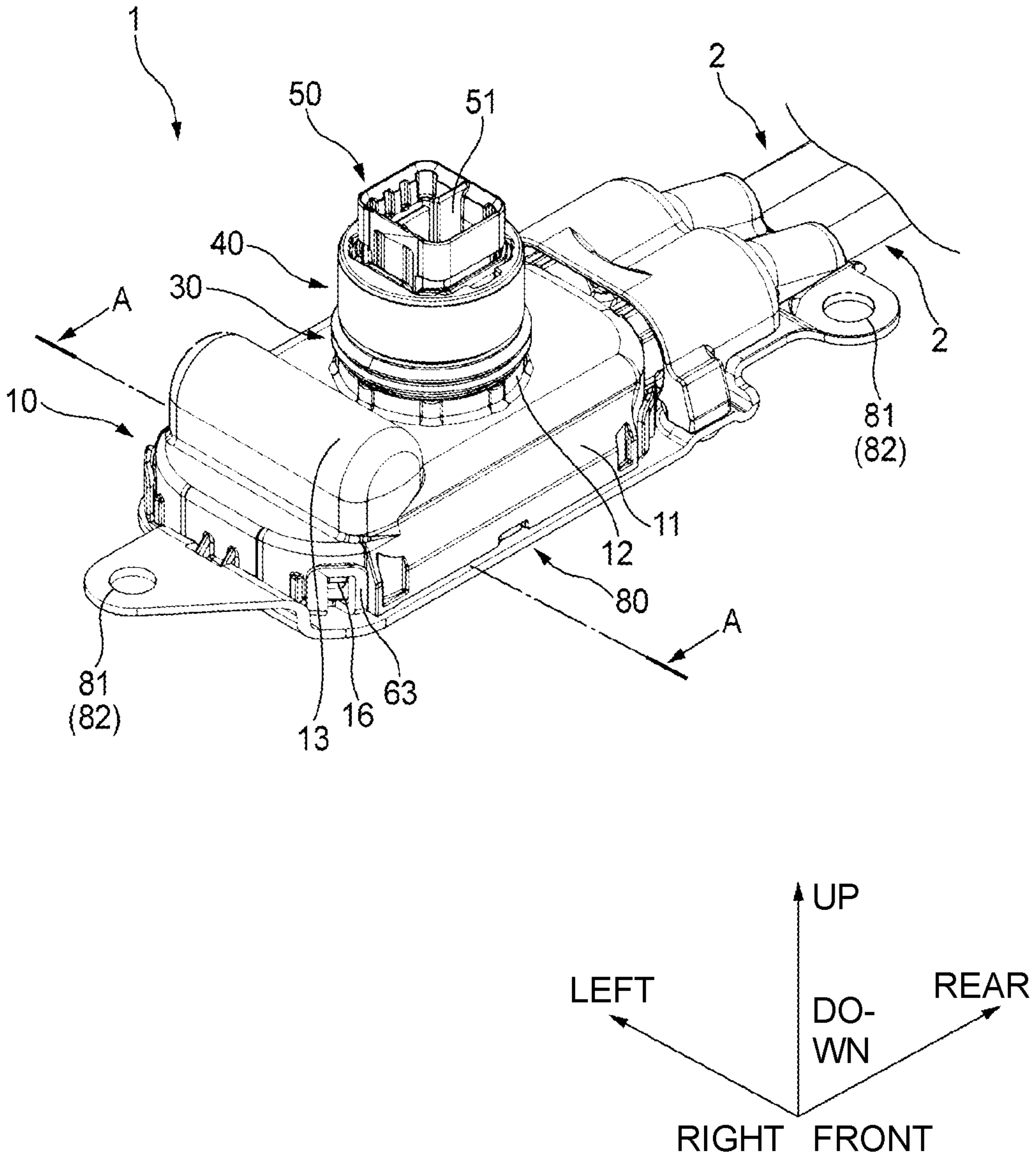
FIG. 1 is a perspective view showing a connector according to an embodiment of the present disclosure.

Hereinafter, a connector 1 according to an embodiment of the present disclosure will be described with reference to the drawings. The connector 1 shown in FIG. 1 functions as a relay connector that electrically connects a pair of electric wires 2 extending from a body portion 11 of a housing 10 and a mating part (not shown) including a fitted portion to be fitted to a fitting portion 12 of the housing 10. The mating part is, for example, an inverter (DC-AC converter) mounted on a vehicle, and one end portions of the pair of electric wires 2 extending from the body portion 11 are connected to, for example, an air conditioner mounted on the vehicle.

Hereinafter, for convenience of explanation, a "front-rear direction", an "up-down direction" and a "left-right direction" are defined as shown in FIGS. 1 to 9. The "front-rear direction", the "up-down direction" and the "left-right direction" are orthogonal to each other. The up-down direction coincides with a fitting direction of the fitting portion 12 and the fitted portion of the mating part.

Figure 4:
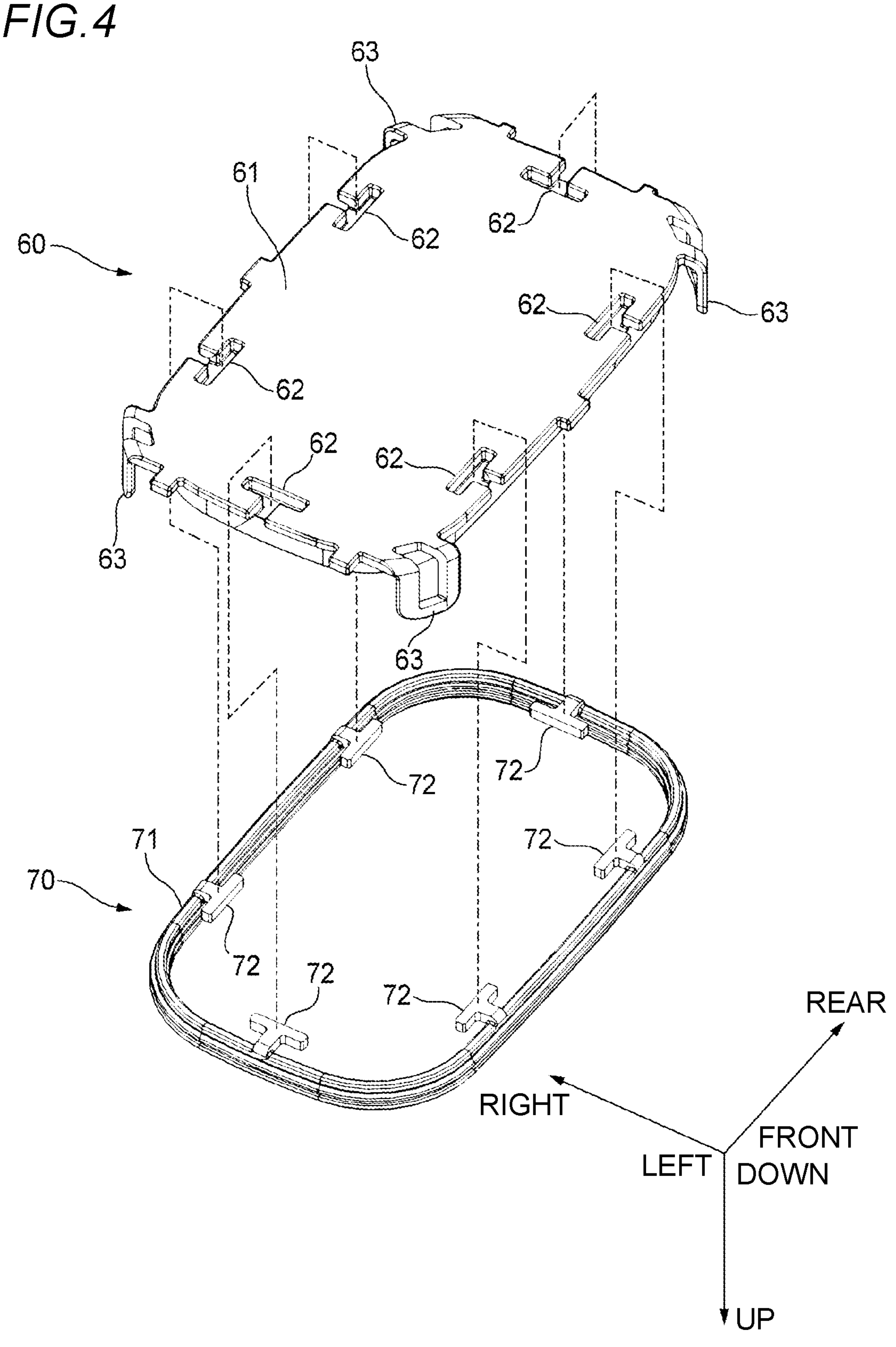
FIG. 4 is a perspective view of a cover and a packing shown in FIG. 2 as viewed from below.
Figure 5:
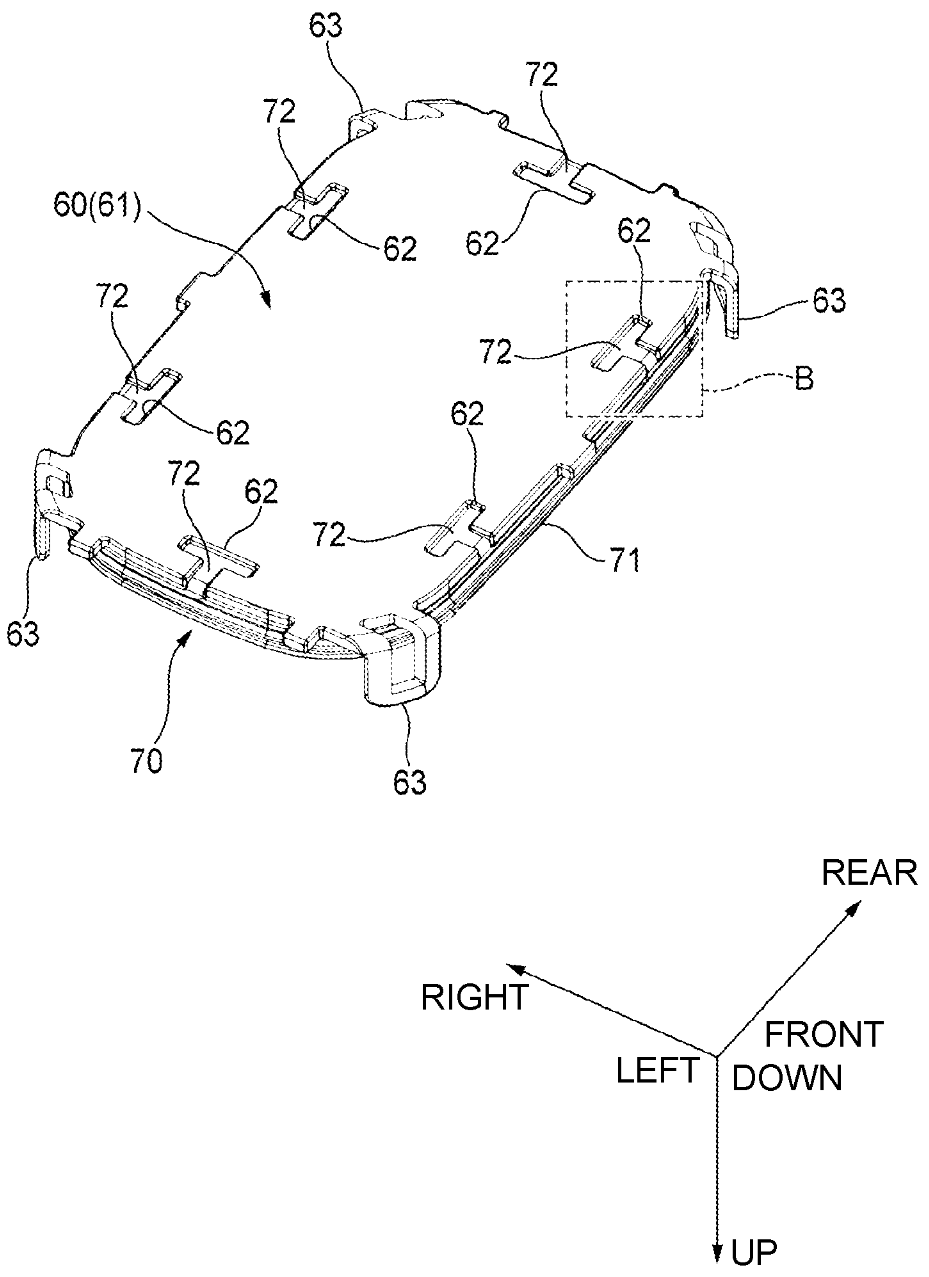
FIG. 5 is a perspective view of the cover attached with the packing as viewed from below.

The connector 1 includes the housing 10. The housing 10 is a resin molded product, and as shown in FIGS. 1 and 4, mainly includes the body portion 11, the fitting portion 12, and a convex portion 13 integrally.

Figure 2:
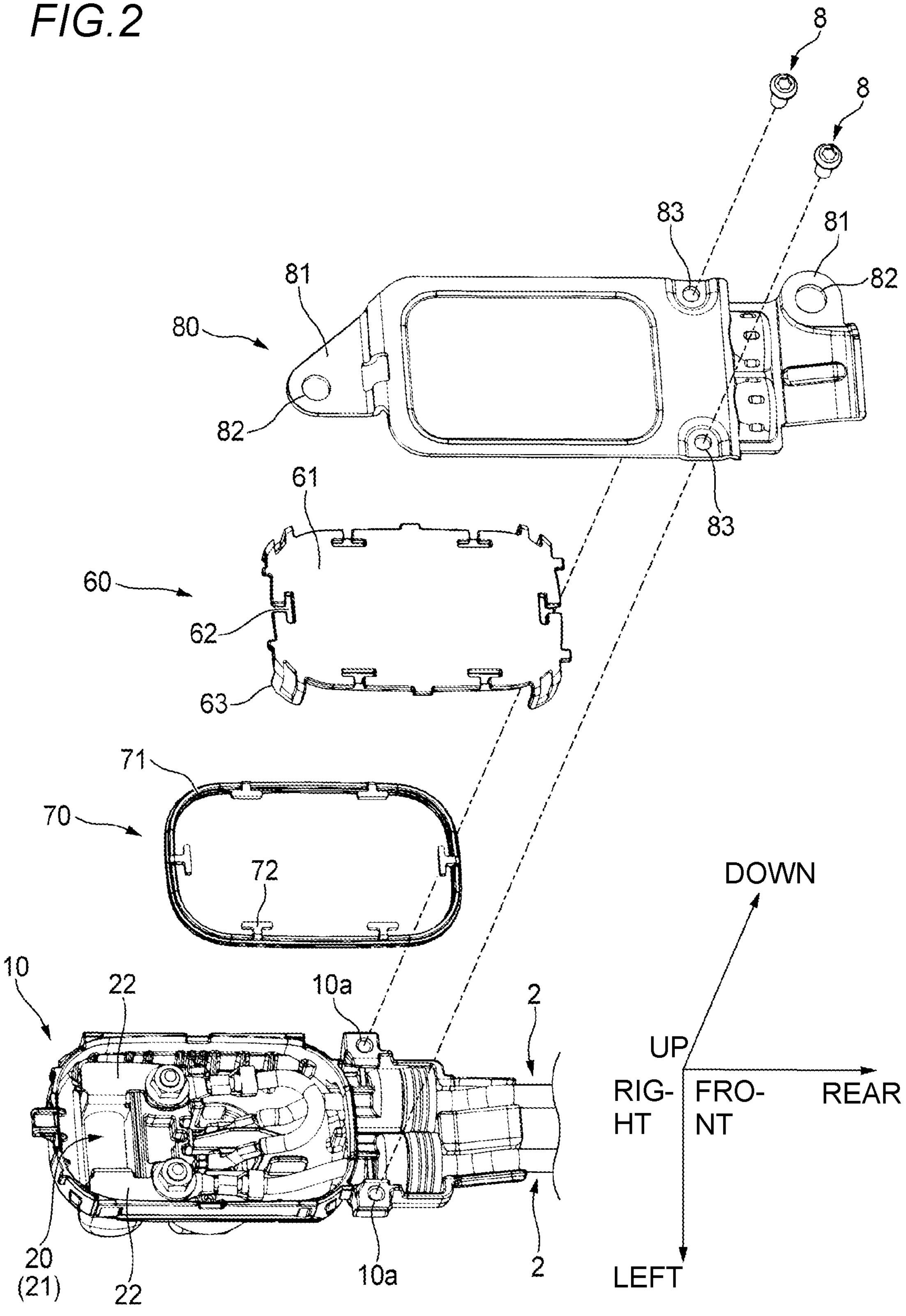
FIG. 2 is an exploded perspective view showing an exploded state of each part attached from below to a body portion of a housing in the connector shown in FIG. 1.
Figure 3:
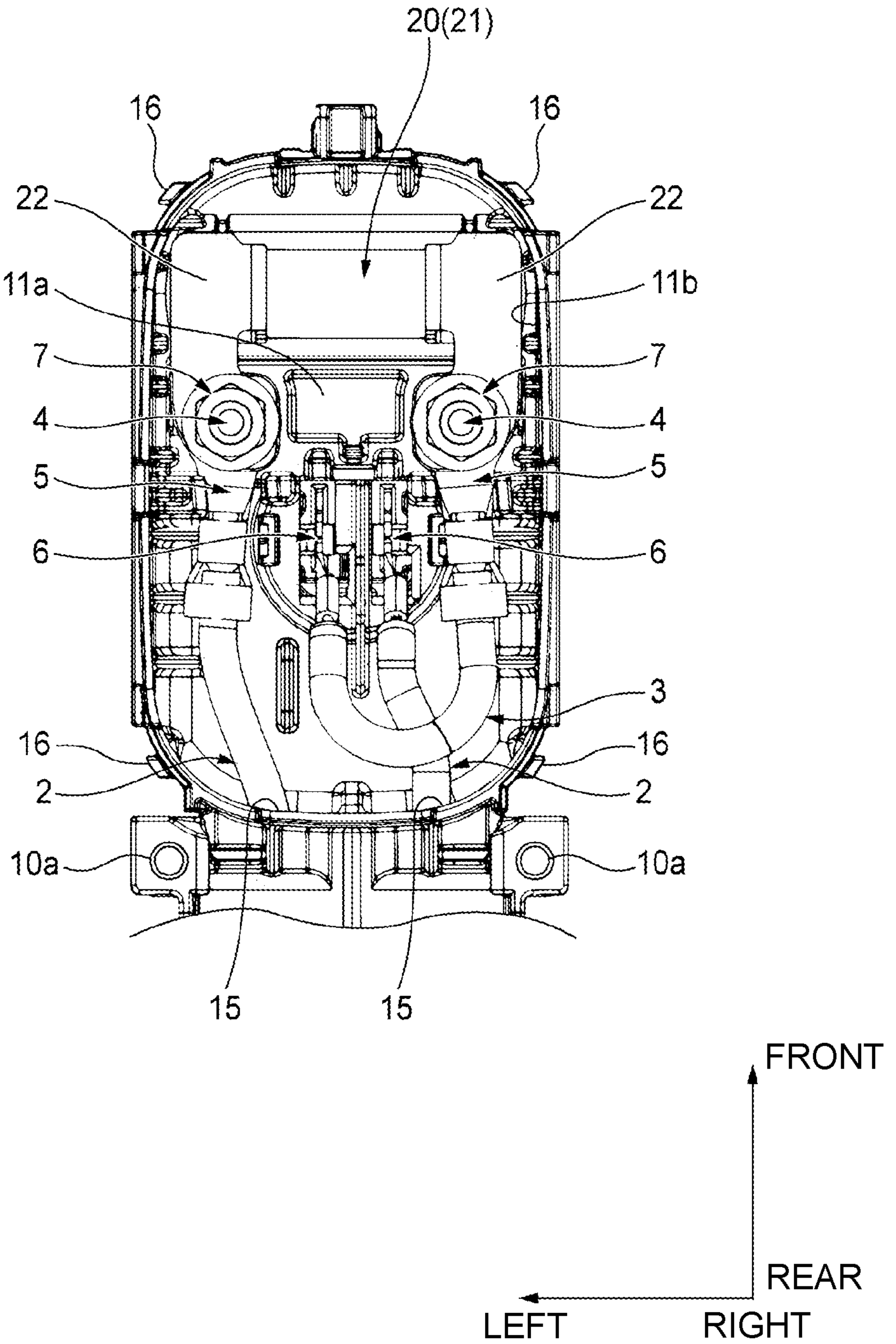
FIG. 3 is a bottom view of the body portion of the housing shown in FIG. 2.

As shown in FIGS. 1, 3 and the like, the body portion 11 has a substantially rectangular parallelepiped box shape extending in the front-rear direction. A substantially rectangular opening 11*b* is formed in a lower portion of the body portion 11 so as to communicate an internal space 11*a* (see FIG. 3) of the body portion 11 with outside in the up-down direction (see FIG. 3). The opening 11*b* is liquid-tightly closed by a resin cover 60 attached with a rubber packing 70 (see FIG. 2). Details of the cover 60 and the packing 70 will be described later. Various parts including a fuse 20, which will be described later, are accommodated in the internal space 11*a* of the body portion 11 (see FIG. 3).

As shown in FIG. 1, the fitting portion 12 is a substantially cylindrical portion that protrudes upward from a substantially central portion of an upper surface of the body portion 11, and is a portion that constitutes a fitting location with the fitted portion of the mating part. As shown in FIG. 1, a packing 30, a front holder 40, and an inner housing 50 are attached to the fitting portion 12 in this order from above.

The packing 30 is a rubber seal member, and functions to seal a gap between an outer periphery of the fitting portion 12 and an inner periphery of the fitted portion of the mating part to be fitted to the fitting portion 12. The front holder 40 is a resin molded product, and is disposed adjacent to the packing 30 to prevent the packing 30 from coming off (upwardly) from the fitting portion 12. The inner housing 50 is a resin molded product, and has a function of defining an opening 51 (see FIG. 1) into which a mating connector (not shown) of the mating part is inserted, a function of holding terminals 6 (see FIG. 3), a function of aligning the terminals 6 with mating terminals (not shown) provided on the mating part (not shown) (so-called alignment function), and the like. Descriptions of detailed shapes and the like of the packing 30, the front holder 40, and the inner housing 50 are omitted.

As shown in FIG. 1, the convex portion 13 is a portion including an upper surface protruding upward and a lower surface recessed upward at a front end portion of an upper wall of the body portion 11. In this example, the convex portion 13 has a semi-cylindrical shape that protrudes upward and extends in the left-right direction. In other words, in the convex portion 13, a part of the upper wall (outer wall) of the body portion 11 is curved so as to protrude upward, thereby forming a hollow portion below the curved part. Note that a thickness of the upper wall (outer wall) of the body portion 11 at such a curved place is substantially constant. The convex portion 13 is a portion that functions to accommodate (a body portion 21 of) the fuse 20 (FIG. 3).

As shown in FIGS. 2 and 3, the fuse 20 includes the cylindrical body portion 21 (so-called glass tube) with a built-in fused portion and a pair of metal extension plates 22 extending from both end portions of the body portion 21. When a current exceeding a predetermined rated current flows through the body portion 21 via the pair of extension plates 22, the fuse 20 functions to break electrical connection between the pair of extension plates 22 by fusing the fused portion described above.

The body portion 21 of the fuse 20 is accommodated inside the convex portion 13 (a semi-cylindrical space), as shown in FIGS. 2 and 3. The pair of extension plates 22 of the fuse 20 are connected to a pair of stud bolts 4 integrated with the body portion 11 of the housing 10 by insert molding, respectively. The pair of stud bolts 4 extends downward within the internal space 11*a* so as to be spaced apart in the left-right direction, from a position between the fitting portion 12 and the convex portion 13 in the front-rear direction on the upper wall of the body portion 11.

A pair of terminal insertion holes (not shown) are formed at a position corresponding to the fitting portion 12 on the upper wall of the body portion 11 of the housing 10 so as to be spaced apart in the left-right direction and communicate the internal space 11*a* and an interior of the fitting portion 12 in the up-down direction. The pair of terminals 6 (see FIG. 3) are inserted from below into the pair of terminal insertion holes. As a result, the terminals 6 are accommodated in the fitting portion 12.

As shown in FIG. 3, a pair of electric wire insertion holes 15 are formed on a rear wall of the body portion 11 of the housing 10 so as to be spaced apart in the left-right direction and communicate the internal space 11*a* of the body portion 11 with the outside in the front-rear direction. In this way, the pair of electric wire insertion holes 15 is positioned so as to sandwich the fitting portion 12 in the front-rear direction with the convex portion 13.

The other end portions of the pair of electric wires 2 extending from the housing 10 are inserted through the pair of electric wire insertion holes 15, respectively, and the other end portions of the pair of electric wires 2 are routed in the internal space 11*a*. Furthermore, an electric wire 3 is routed inside the internal space 11*a*. Terminals (so-called LA terminals) 5 are connected to the other end portion of the wire 2 inserted through the electric wire insertion hole 15 on the left side and one end of the wire 3, respectively. The terminals 6 having a rectangular flat plate-like shape are connected to the other end portion of the wire 2 inserted through the electric wire insertion hole 15 on the right side and the other end of the wire 3, respectively.

The pair of terminals 5 are connected to the pair of stud bolts 4, respectively, and are tightened together with the pair of extension plates 22 of the fuse 20 using a pair of nuts 7 (see FIG. 3). The pair of terminals 6 are inserted into the pair of terminal insertion holes of the housing 10 from below and fixed to the housing 10 with upper end portions thereof exposed inside the fitting portion 12. The pair of terminals 6 are fixed to the housing 10 by a pair of locking pieces (not shown) provided on the inner housing 50 attached to the fitting portion 12 engaging with a pair of locking holes (not shown) provided on the pair of terminals 6. As a result, of the pair of electric wires 2 extending from the housing 10, the electric wire 2 on the right side is directly connected to the terminal 6 on the right side, and the electric wire 2 on the left side is connected to the terminal 6 on the left side via the fuse 20.

As shown in FIG. 3, a locking projection 16 is provided at each one of four corner portions on an outer peripheral side surface of the body portion 11 of the housing 10. The locking projections 16 function to hold the cover 60 to the housing 10 in cooperation with locking frame portions 63 (see FIG. 2) of the cover 60, which will be described later.

Next, referring to FIG. 2 and the like, details of the cover 60, the packing 70, and a pressing plate 80, which are attached to the body portion 11 of the housing 10 from below, will be described in order.

First, the cover 60 will be described. The cover 60 functions to close the opening 11*b* (see FIG. 3) of the body portion 11 of the housing 10. The cover 60 is a resin molded product, and has a flat plate-like body portion 61 as shown in FIGS. 2 and 4. The body portion 61 has a substantially rectangular outer shape corresponding to a shape of the opening 11*b* (see FIG. 3). In other words, the body portion 61 constitutes a cover surface 61*a* that closes the opening 11*b*.

Figure 6:
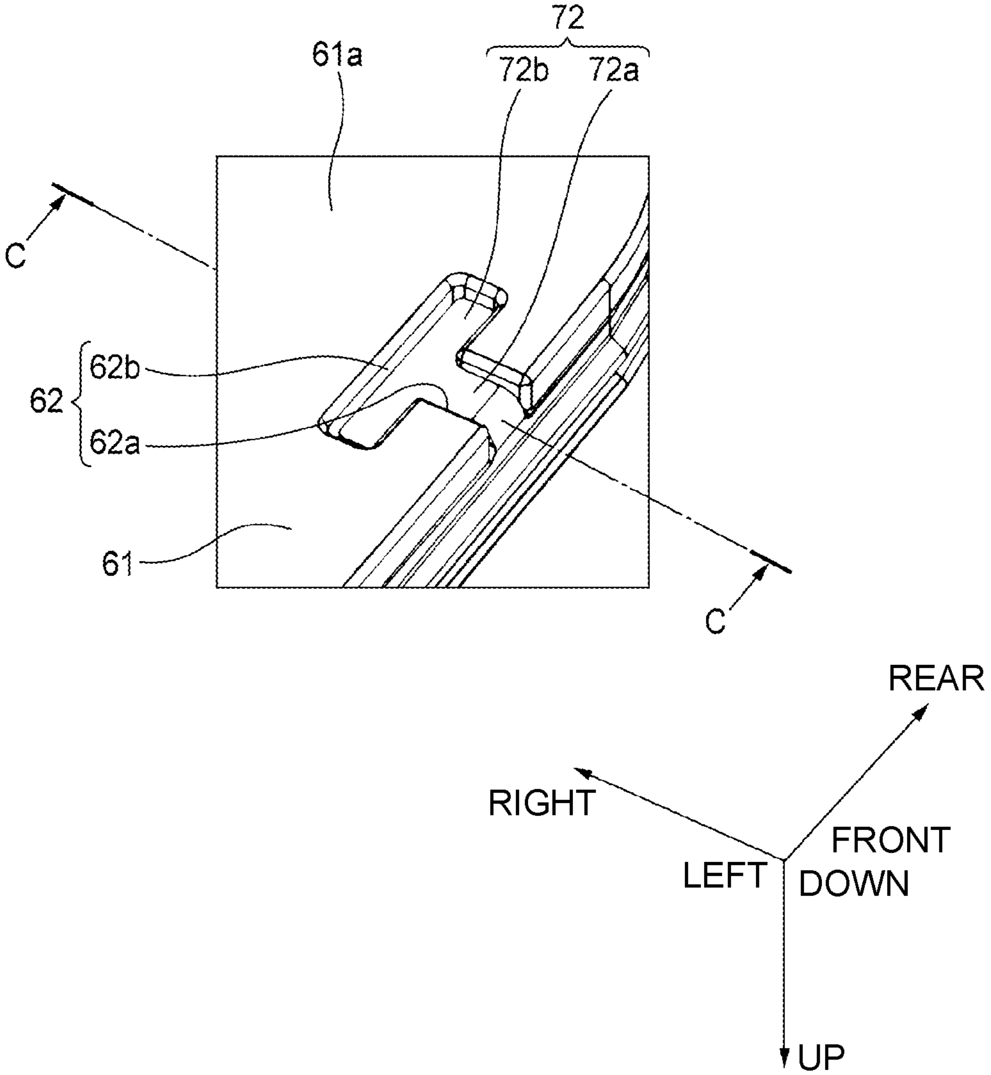
FIG. 6 is an enlarged view of a part B in FIG. 5.
Figure 7:
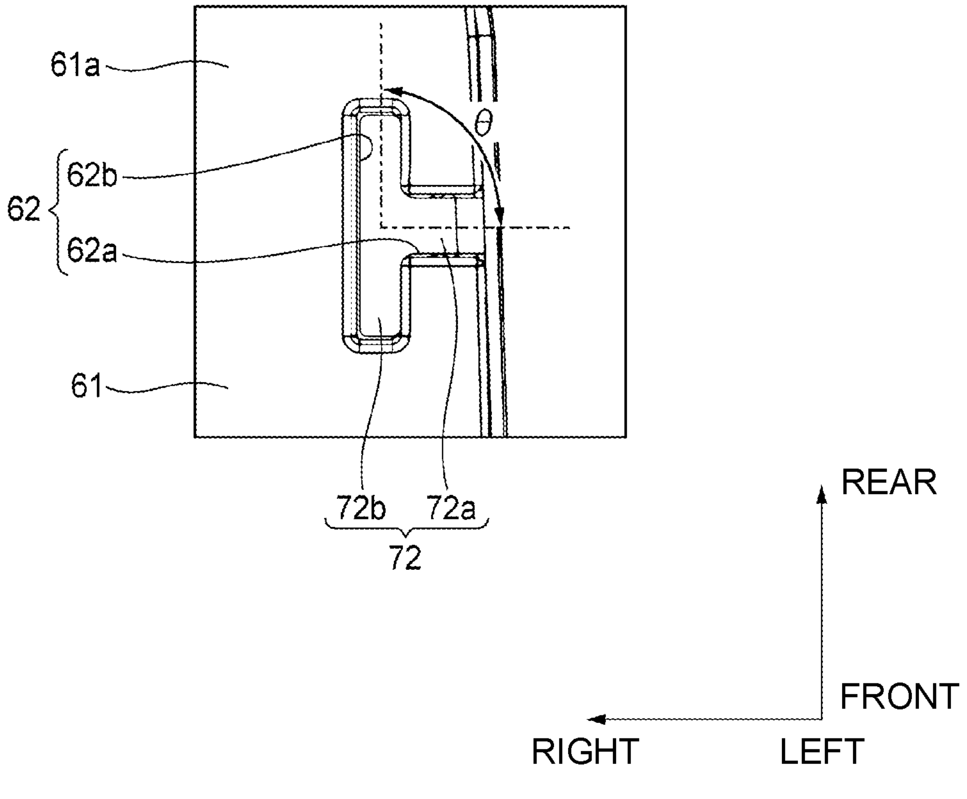
FIG. 7 is an enlarged bottom view showing the part B in FIG. 5.
Figure 8:
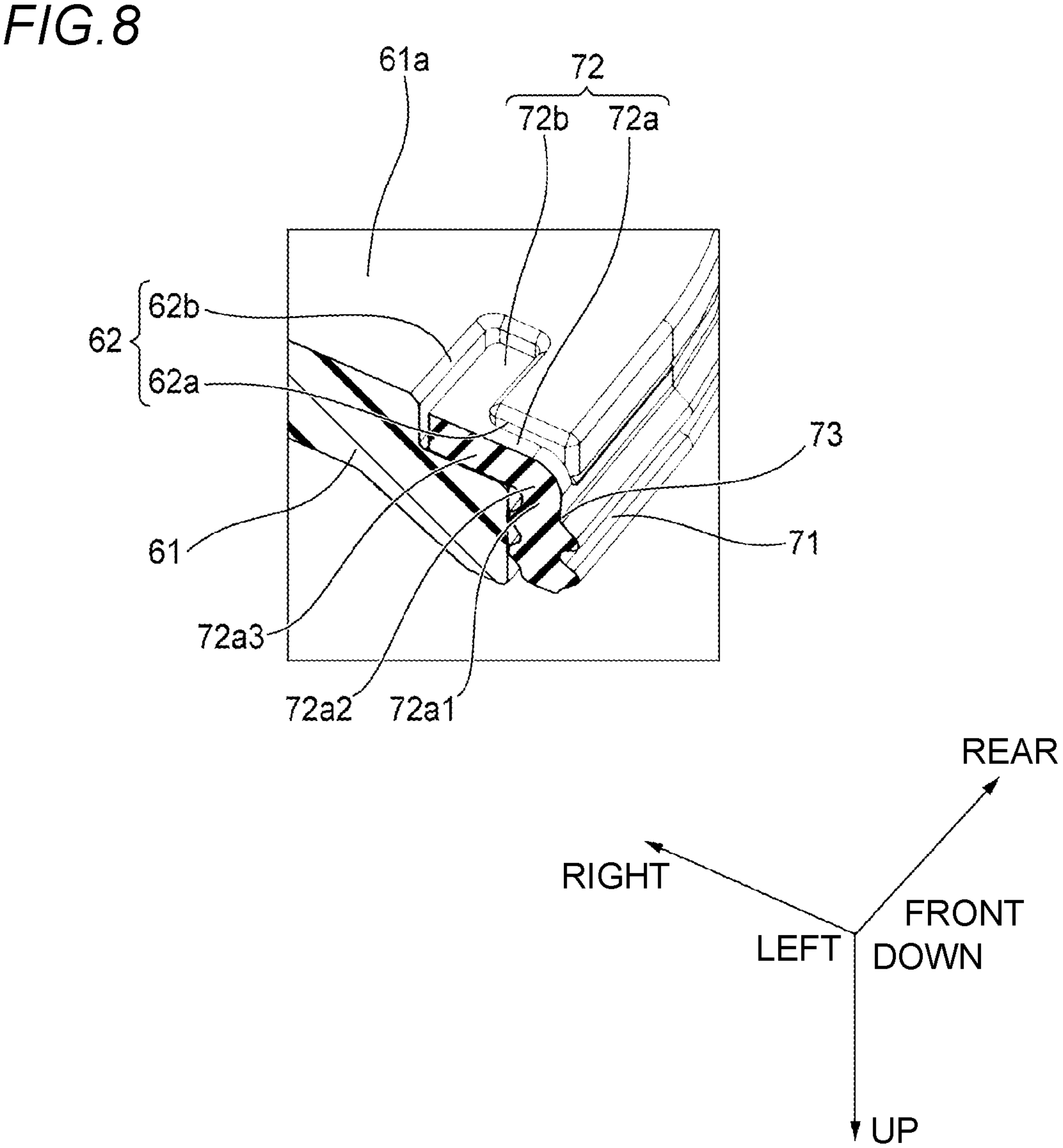
FIG. 8 is a perspective view of a cross section taken along a line C-C in FIG. 6.
Figure 9:
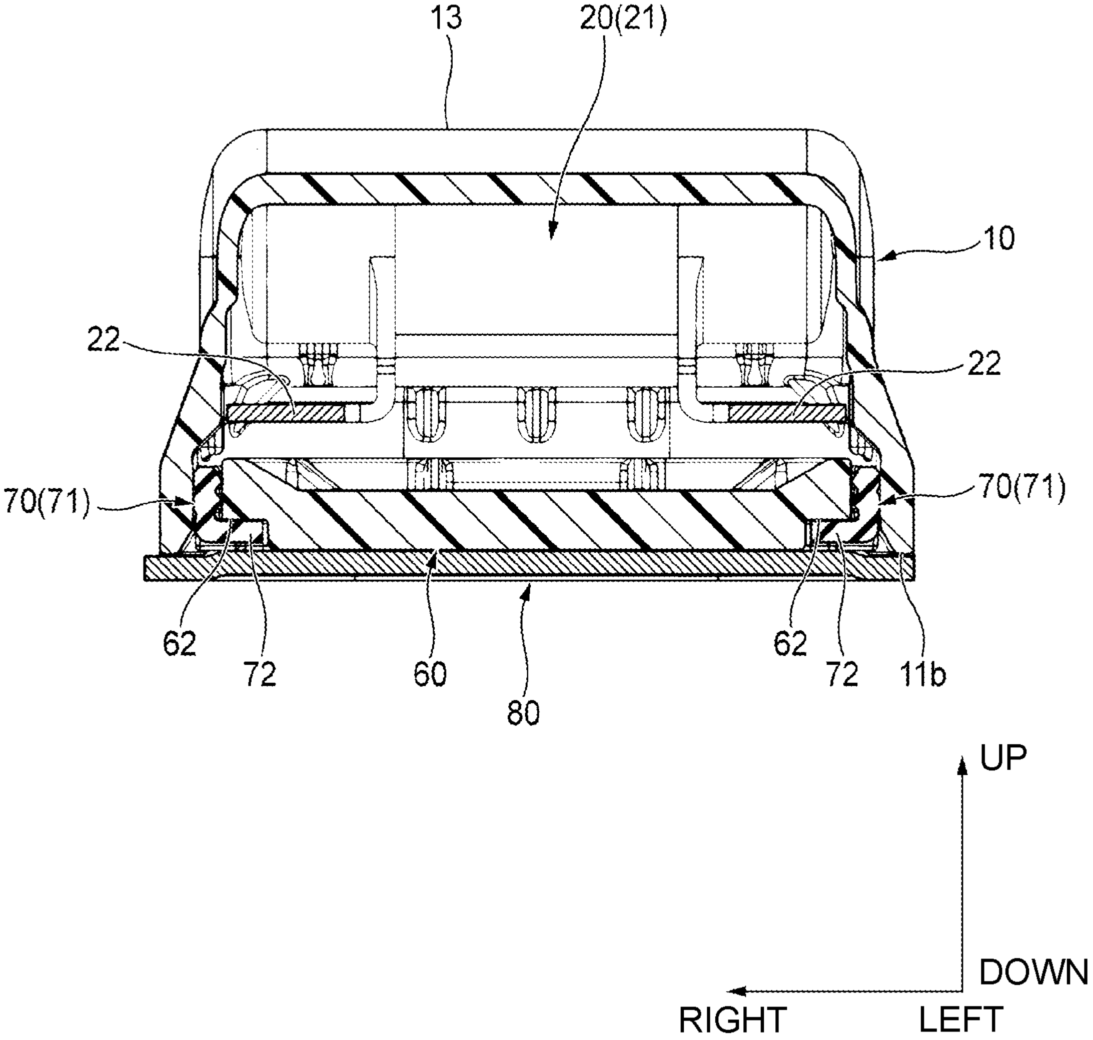
FIG. 9 is a cross-sectional view taken along a line A-A in FIG. 1.

Fitting portions 62 are formed at a plurality of locations in a circumferential direction of an outer peripheral edge portion of a lower surface of the body portion 61 (see FIGS. 2 and 4). In this example, as shown in FIGS. 4,6 and 8, each fitting portion 62 includes a first portion 62*a* extending along a planar direction of the body portion 61 from an outer peripheral edge of the body portion 61 toward a direction orthogonal to the outer peripheral edge, and a second portion 62*b* extending along the planar direction of the body portion 61 from an extending end of the first portion 62*a* toward both sides in a direction orthogonal to the first portion 62*a* (that is, a direction along the outer peripheral edge). Each fitting portion 62 has a substantially T shape as a whole that continues from the outer peripheral edge. A locking piece portion 72, which will be described later, of the packing 70 is fitted into the fitting portion 62. Four corners of the body portion 61 are provided with locking frame portions 63 extending upward from the four corners corresponding to the four locking projections 16 (see FIG. 3) of the body portion 11 of the housing 10, respectively.

Next, the packing 70 will be described. The packing 70 is a seal member made of rubber, and functions to seal a gap between an outer peripheral surface (that is, peripheral edge) of the cover 60 and an inner wall surface of the opening 11*b* of the body portion 11 of the housing 10. The packing 70 includes a substantially rectangular annular body portion 71 corresponding to an outer shape of the peripheral edge of the body portion 61 of the cover 60. Annular lip portions are formed on an inner periphery side and an outer periphery side of the body portion 71, respectively.

Locking piece portions 72 branching from a lower side of the body portion 71 toward inside of an annulus of the body portion 71 are provided, corresponding to the plurality of fitting portions 62 of the cover 60, at a plurality of locations in the circumferential direction of the body portion 71. As shown in FIGS. 4, 6 and 8, each locking piece portion 72 includes an extending portion 72*a* extending downward from a lower side (that is, an end portion 73 on the outside. See FIG. 8) of the body portion 71 and curvingly extending along the cover surface 61*a* of the body portion 61 of the cover 60 toward an annulus inner direction, which is orthogonal to the body portion 71, and a protruding portion 72*b* extending from an extending end of the extending portion 72*a* in a direction orthogonal to the extending portion 72*a* (that is, along the cover surface 61*a* of the body portion 61 of the cover 60). More specifically, as shown in FIG. 8, the extending portion 72*a* includes a first portion 72*al* extending downward from the end portion 73 on the outside (lower side) of the body portion 71, a second portion 72*a*2 that is continuous with the first portion 72*al* and curves toward the inside of the annulus (that is, to the right side in FIG. 8), and a third portion 72*a*3 that is continuous with the second portion 72*a*2 and extends along the cover surface 61*a* (that is, to the right side in FIG. 8). Each locking piece portion 72 has a generally T shape as a whole, corresponding to the shape of the fitting portion 62 of the cover 60. In this example, an angle θ (see FIG. 7) formed by a protruding direction of the extending portion 72*a* and an extending direction of the protruding portion 72*b* is 90 degrees.

In this example, since a length of the first portion 72*al* of the extending portion 72*a* in the up-down direction is short, the extending portion 72*a* extends downward from the end portion 73 of the body portion 71 of the packing 70 and immediately curves into the annulus. However, for example, when a thickness of the body portion 61 of the cover 60 in the up-down direction is thicker than that in this example, in the extending portion 72*a*, the first portion 72*al* having a sufficient length corresponding to the thickness of the body portion 61 of the cover 60 may extend from the end portion 73 of the body portion 71 in the up-down direction, and then curves into the annulus. That is, the length in the up-down direction of the first portion 72*al* of the extending portion 72*a* may be appropriately determined according to the shape of the cover 60 and the like. Similarly, a curvature radius of the second portion 72*a*2 of the extending portion 72*a* and a length of the third portion 72*a*3 may be appropriately determined according to the shape of the cover 60 and the like.

The packing 70 is attached to the cover 60 from above so that the body portion 71 is in close contact with the outer peripheral surface of the body portion 61 of the cover 60 and the plurality of locking piece portions 72 are respectively fitted into the plurality of fitting portions 62 (see FIGS. 5 to 8). More specifically, the extending portion 72*a* and the protruding portion 72*b* of each locking piece portion 72 are fitted into the corresponding first portion 62*a* and the second portion 62*b* of the fitting portion 62, respectively. As a result, as shown in FIGS. 6 and 8, the entire locking piece portion 72 is housed in a groove of the fitting portion 62. That is, the locking piece portion 72 is fitted into the fitting portion 62 so that the locking piece portion 72 does not protrude outside the recess of the fitting portion 62.

In this way, when the packing 70 is attached to the cover 60, and the body portion 71 of the packing 70 attempts to move, relative to the cover 60, in a direction away from the cover 60 (upward), an outward force (in the direction away from the cover 60) along the extending direction of the extending portion 72*a* acts on the locking piece portion 72. Even when such an outward force acts on the locking piece portion 72, the protruding portion 72*b* of the locking piece portion 72 is caught by the second portion 62*b* of the fitting portion 62. Therefore, the locking piece portion 72 is prevented from coming off outward from the fitting portion 62, so that the packing 70 is prevented from separating from the cover 60 (that is, coming off upward).

The cover 60 attached with the packing 70 is attached to the opening 11*b* of the body portion 11 of the housing 10. When the cover 60 is attached to the opening 11*b*, the body portion 71 of the packing 70 is positioned between the outer peripheral surface of the body portion 61 and the inner wall surface of the opening 11*b* to seal the gap between the two (see FIG. 9). The cover 60 is held by the housing 10 by engaging the four locking frame portions 63 of the cover 60 with the locking projections 16 of the housing 10. When the cover 60 attached to the housing 10 is taken out from the housing 10, a force acts on the body portion 71 of the packing 70 in the direction away from the cover 60 (upward) due to a frictional force between the body portion 71 of the packing 70 and the inner wall surface of the opening 11*b*. In this case as well, the locking piece portion 72 is prevented from coming off outward from the fitting portion 62 by the same effect as described above, so that the packing 70 is prevented from separating from the cover 60 (that is, coming off upward).

Next, the pressing plate 80 will be described. The pressing plate 80 has a function of preventing the cover 60 attached with the packing 70 from coming off (coming off downward) from the housing 10 and a function of fixing the connector 1 to the mating part. The pressing plate 80 is formed by subjecting a single metal plate to predetermined press process, bending process, and the like.

As shown in FIG. 2, the pressing plate 80 has a flat plate-like shape capable of covering an entire circumference of an outer peripheral edge of the body portion 61 of the cover 60 attached to the housing 10. The pressing plate 80 is provided with flange portions 81 at a plurality of locations (two locations in this example) that extend so as to protrude from the housing 10 when the pressing plate 80 is attached to the housing 10 (also see FIG. 1). A bolt insertion hole 82 is formed through each flange portion 81 in the up-down direction. Screw insertion holes 83 penetrating in the up-down direction are formed at a plurality of (two locations in this example) predetermined locations of the pressing plate 80.

The pressing plate 80 is attached to the housing 10 from below so as to cover the cover 60 from the lower side, so that the pressing plate 80 is fixed to the housing 10 by screwing a screw 8 (see FIG. 2) inserted through each screw insertion hole 83 into a corresponding female screw portion 10*a* (see FIG. 2) provided on the housing 10. By fixing the pressing plate 80 to the housing 10, the cover 60 to which the packing 70 is attached is prevented from coming off from the housing 10 (coming off downward).

As described above, mounting of the connector 1 is completed, and the connector 1 shown in FIG. 1 is obtained. The mounted connector 1 is mounted to the mating part such that the fitting portion 12 is fitted to the fitted portion of the mating part, and is fastened and fixed to the mating part using a bolt (not shown) inserted through the bolt insertion hole 82 of the flange portion 81 of the pressing plate 80. The mating connector of the mating part is inserted into the fitting portion 12 of the connector 1 fixed to the mating part. As a result, mating terminals (female terminals) accommodated in the mating connector are electrically connected to the pair of terminals 6 located within the fitting portion 12.

Functions and Effects

As described above, according to the connector 1 of the present embodiment, the packing 70 includes the annular body portion 71, the extending portion 72*a* that extends from the end portion 73 of the body portion 71 on the outside and extends along the cover surface 61*a* of the cover 60, and the protruding portion 72*b* that protrudes from the extending portion 72*a* so as to intersect with the extending direction of the extending portion 72*a* along the cover surface 61*a*. When the packing 70 is attached to the cover 60, the extending portion 72*a* and the protruding portion 72*b* are fitted into the fitting portion 62 of the cover 60. By this fitting, the extending portion 72*a* and the protruding portion 72*b* of the packing 70 are caught by the fitting portion 62 of the cover 60, so that the cover 60 and the packing 70 are firmly fixed to each other. Furthermore, since the extending portion 72*a* and the protruding portion 72*b* extend along the body portion 61, it is not necessary to increase the thickness of the cover 60 or the thickness of the packing 70 for fixing. Therefore, the connector 1 according to the present embodiment can be made thinner and smaller while properly fixing the packing 70 to the cover 60.

Furthermore, the angle formed by the extending portion 72*a* and the protruding portion 72*b* of the packing 70 is 90 degrees. As a result, when the packing 70 tends to move in the direction away from the cover 60, the extending portion 72*a* and the protruding portion 72*b* are more reliably prevented from coming off from the fitting portion 62 of the cover 60. That is, the packing 70 can be attached to the cover 60 more firmly.

Furthermore, the entire extending portion 72*a* and protruding portion 72*b* are housed in the fitting portion 62 of the cover 60. That is, the extending portion 72*a* and the protruding portion 72*b* do not protrude outside the fitting portion 62. Therefore, the thickness of the connector 1 can be further reduced.

Other Embodiments

The present disclosure is not limited to the above embodiment, and various modifications can be adopted within the scope of the present disclosure. For example, the present disclosure is not limited to the above-described embodiment, and may be appropriately modified, improved or the like. In addition, materials, shapes, dimensions, numbers, arrangement locations, and the like of elements in the above-described embodiment are optional and not limited as long as the object of the present disclosure can be achieved.

Figure 10A:
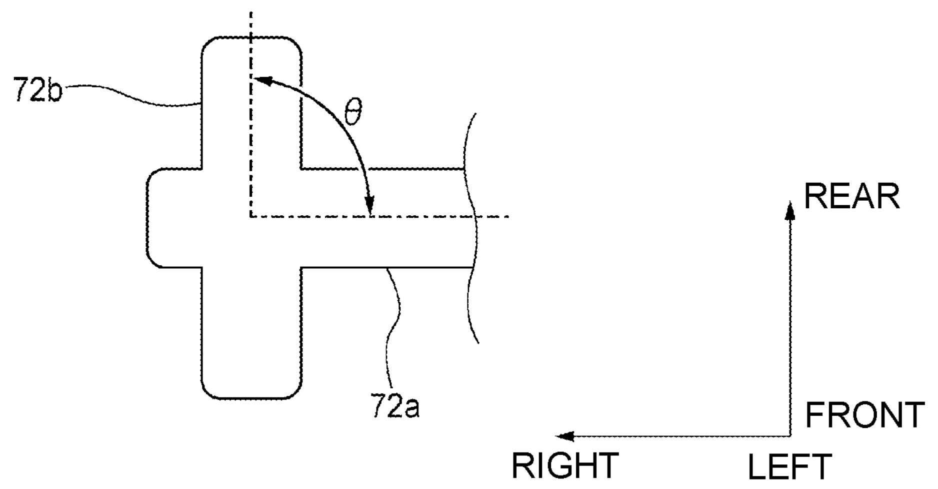
FIGS. 10A to 10C are schematic diagrams corresponding to FIG. 7 showing modifications of the present disclosure.
Figure 10B:
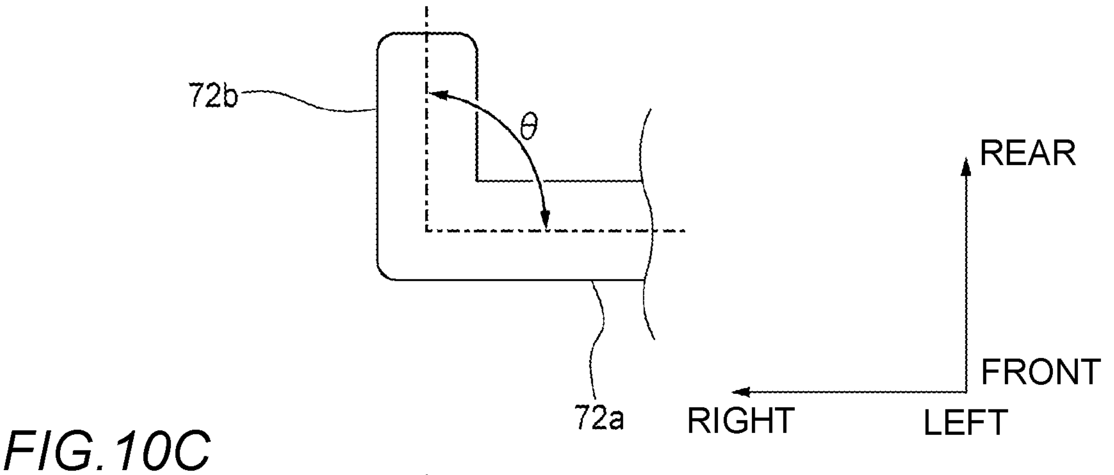
Figure 10C:
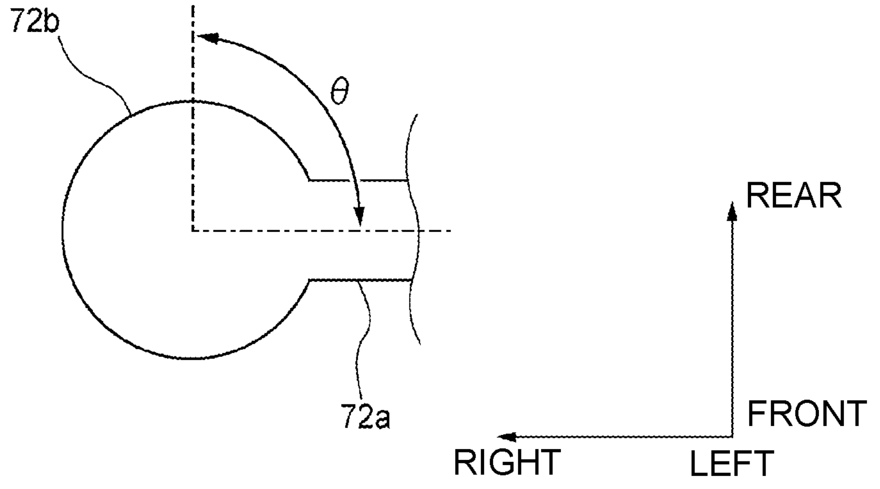

In the above embodiment, the angle θ (see FIG. 7) formed by the protruding direction of the extending portion 72*a* of the packing 70 and the extending direction of the protruding portion 72*b* is 90 degrees. However, this angle θ may be an acute angle of less than 90 degrees. In other words, in the above embodiment, the extending portion 72*a* and the protruding portion 72*b* have a generally T shape as a whole. However, the extending portion 72*a* and the protruding portion 72*b* may have a cross shape as a whole in which the extending portion 72*a* and the protruding portion 72*b* intersect with each other as shown in FIG. 10A, or may have a substantially L shape as a whole as shown in FIG. 10B. Furthermore, as shown in FIG. 10C, the extending portion 72*a* and the protruding portion 72*b* may have a shape in which a part of the extending portion 72*a* (in this example, the extending end) expands to surroundings (in this example, in a substantially circular shape) so as to form the protruding portion 72*b*.

Furthermore, in the above embodiment, the entire locking piece portion 72 (the extending portion 72*a* and the protruding portion 72*b*) of the packing 70 is housed in the fitting portion 62 of the cover 60. However, a part or all of the locking piece portion 72 may protrude outside the fitting portion 62.

Here, features of the embodiment of the connector 1 according to the present disclosure described above are summarized and listed briefly in the following first to third aspects.

According to a first illustrative aspect of the present disclosure, a connector (1) includes: a terminal fitting (6); an electric wire (2, 3) connected to the terminal fitting (6); a housing (10) that includes an internal space (11*a*) in which the electric wire (2, 3) is routed; an opening (11*b*) that connects the internal space (11*a*) with an outside of the housing (10); a cover (60) that includes a cover surface (61*a*) closing the opening (11*b*) and is inserted into the opening (11*b*) to isolate the internal space (11*a*) from the outside; and a seal member (70) that seals a gap between an opening inner wall of the opening (11*b*) and a peripheral edge of the cover (60). The seal member (70) includes a body portion (71) having an annular shape along the peripheral edge of the cover (60), an extending portion (72*a*) that extends from an end portion (73) of the body portion (71) on a side of the outside along the cover surface (61*a*), and a protruding portion (72*b*) that protrudes in a direction of intersecting with an extending direction of the extending portion (72*a*) and extends from the extending portion (72*a*) along the cover surface (61*a*). The cover (60) includes a recessed fitting portion (62) into which the extending portion (72*a*) and the protruding portion (72*b*) of the seal member (70) are fitted.

According to the connector having the configuration in the above first aspect, the seal member includes the body portion having the annular shape, the extending portion that branches from the body portion and extends outward from the gap between the cover and the housing, and the protruding portion that protrudes from the extending portion so as to intersect with the extending direction of the extending portion along the cover surface. The seal member is attached to the cover by fitting the extending portion and the protruding portion into the fitting portion of the cover. With this fitting structure, even if an unintended external force is applied to the seal member, the cover is prevented from being separated from the seal member by the extending portion and the protruding portion of the seal member catching on and engaging with the fitting portion of the cover. Furthermore, since the seal member is held firmly enough with this catch (engagement), there is no need to increase the thickness of the cover or the thickness of the seal member beyond the extent necessary for the water stopping. Therefore, in the connector having the configuration, it is possible to properly fix the seal member to the cover and to reduce the thickness and size of the connector at the same time.

According to a second illustrative aspect of the present disclosure, an angle (θ) formed by the extending direction of the extending portion (72*a*) and a protruding direction of the protruding portion (72*b*) is 90 degrees or less.

According to the connector having the configuration in the above second aspect, the angle formed by the extending portion and the protruding portion of the seal member is 90 degrees or less. As a result, a holding force by the above catching (that is, the engagement of the extending portion and the protruding portion with the fitting portion) is increased, thereby further reliably preventing the extending portion and the protruding portion from unintentionally coming off from the fitting portion of the cover. That is, the seal member can be more firmly attached to the cover.

According to a third illustrative aspect of the present disclosure, the extending portion (72*a*) and the protruding portion (72*b*) are fitted into the fitting portion (62) such that the extending portion (72*a*) and the protruding portion (72*b*) do not protrude out of a recess of the fitting portion (62).

According to the connector having the configuration in the above third aspect, the extending portion and the protruding portion are housed in the fitting portion such that the extending portion and the protruding portion do not protrude outside the recess of the fitting portion of the cover. In other words, the extending portion and the protruding portion do not protrude from the cover surface of the cover. Therefore, since there is no such protrusion, the overall thickness of the connector can be further reduced.

According to the connector of the present disclosure, the seal member includes the body portion having the annular shape, the extending portion that extends from the end portion of the body portion on the outside and extends along the cover surface, and the protruding portion that protrudes from the extending portion so as to intersect with the extending direction of the extending portion along the cover surface. The seal member is attached to the cover by fitting the extending portion and the protruding portion into the fitting portion of the cover. With this fitting structure, even if an unintended external force is applied to the seal member, the cover is prevented from being separated from the seal member by the extending portion and the protruding portion of the seal member catching on and engaging with the fitting portion of the cover. Furthermore, since the seal member is held firmly enough with this catch (engagement), there is no need to increase the thickness of the cover or the thickness of the seal member beyond the extent necessary for the water stopping. Therefore, in the connector having the configuration, it is possible to properly attach the seal member to the cover and to reduce the thickness and size of the connector at the same time. As described above, according to the present disclosure, it is possible to provide a connector that can be reduced in thickness and size while properly holding the seal member to the cover.

What is claimed is:

1. A connector, comprising:

a terminal fitting;

an electric wire connected to the terminal fitting;

a housing that includes an internal space in which the electric wire is routed;

an opening that connects the internal space with an outside of the housing;

a cover that includes a cover surface closing the opening and is inserted into the opening to isolate the internal space from the outside; and a seal member that seals a gap between an opening inner wall of the opening and a peripheral edge of the cover; wherein the seal member includes a body portion having an annular shape along the peripheral edge of the cover, an extending portion that extends from an end portion of the body portion on a side of the outside along the cover surface, and a protruding portion that protrudes in a direction of intersecting with an extending direction of the extending portion and extends from the extending portion along the cover surface, the cover includes a recessed fitting portion into which the extending portion and the protruding portion of the seal member are fitted, and the extending portion and the protruding portion are fitted into the fitting portion such that the extending portion and the protruding portion do not protrude out of a recess of the fitting portion.

2. The connector according to claim 1, wherein an angle formed by the extending direction of the extending portion and a protruding direction of the protruding portion is 90 degrees or less.

* * * * *